United States Patent
Gandel et al.

(10) Patent No.: US 6,853,160 B1
(45) Date of Patent: Feb. 8, 2005

(54) AIR CONDITIONING VALVE ACTUATOR FOR A MOTOR VEHICLE

(75) Inventors: Pierre Gandel, Montfaucon (FR); Daniel Prudham, Thise (FR); Daniel Dietz, Sonceboz (CH)

(73) Assignee: Societe Industrielle de Sonceboz S.A., Sonceboz (CH)

( * ) Notice: Subject to any disclaimer, the term of this patent is extended or adjusted under 35 U.S.C. 154(b) by 283 days.

(21) Appl. No.: 10/130,418

(22) PCT Filed: Nov. 14, 2000

(86) PCT No.: PCT/FR00/03165

§ 371 (c)(1),
(2), (4) Date: May 17, 2002

(87) PCT Pub. No.: WO01/37410

PCT Pub. Date: May 25, 2001

(30) Foreign Application Priority Data

Nov. 17, 1999 (FR) ............................................. 99 14432

(51) Int. Cl.$^7$ ............................ G05B 13/00; G05B 9/02
(52) U.S. Cl. ....................... 318/561; 318/663; 318/666; 310/89; 123/399
(58) Field of Search ................................ 318/592, 663, 318/628, 561, 434; 29/596, 883; 475/149; 180/444; 310/68 B, 75 R, 89, 90, 93, 105; 123/399; 74/425

(56) References Cited

U.S. PATENT DOCUMENTS

| 4,616,164 A | * | 10/1986 | Kenny et al. ................ 318/666 |
| 4,795,867 A | * | 1/1989 | Ohi et al. ................... 200/37 R |
| 4,818,924 A | * | 4/1989 | Burney ........................ 318/561 |
| 4,931,710 A | * | 6/1990 | DeVara et al. ............... 318/663 |
| 5,062,611 A | * | 11/1991 | Hatton .................... 251/129.11 |
| 5,161,504 A | * | 11/1992 | Guest et al. ................. 123/361 |
| 5,363,713 A | * | 11/1994 | Pearson ....................... 74/425 |
| 5,431,141 A | * | 7/1995 | Kanazawa et al. .......... 123/399 |
| 5,727,653 A | * | 3/1998 | Grossenbacher et al. . 185/40 R |
| 5,777,410 A | * | 7/1998 | Asakura et al. ................ 310/71 |
| 5,937,507 A | * | 8/1999 | Asakura et al. ............... 29/596 |
| 6,028,384 A | * | 2/2000 | Billman et al. ............... 310/83 |
| 6,097,123 A | * | 8/2000 | Weiss et al. ................. 310/105 |
| 6,509,661 B1 | * | 1/2003 | Kujira et al. ................. 310/89 |
| 2003/0005714 A1 | * | 1/2003 | Odachi et al. ................ 62/236 |

FOREIGN PATENT DOCUMENTS

| EP | 0-336-207 | * | 3/1989 |
| EP | 0-622-564 | * | 4/1994 |
| JP | 9-329215 | * | 12/1997 |
| JP | 10-230-736 | * | 9/1998 |

* cited by examiner

Primary Examiner—Paul Ip
(74) Attorney, Agent, or Firm—Harrison & Egbert

(57) ABSTRACT

An air conditioning valve actuator for a motor vehicle operating on an electric step motor with a permanent magnet capable of delivering mechanical power at least equal to 50 mW, and a reduction unit for decreasing the amplitude of the angular pitch and increase the output torque. The motor is defined by the following relationship: $10^{-6} < \gamma^2/R_0 <$, wherein: $\gamma$ is the torque constant, proportional to the magnet volume and, $R_0$ is the characteristic coefficient of the volume of copper and the length of the average turn of the coils, in which $R_0 = \rho \cdot Lsp/(Scu \cdot \sigma)$, $\rho$ being the resistivity of copper, Lsp being the length of the average turn of a coil, Scu being the copper section of a coil and $\sigma$ the filling coefficient of a coil. A controller is cooperative with the motor power supply enabling to accelerate gradually the frequency of the supply of the windings.

5 Claims, 2 Drawing Sheets

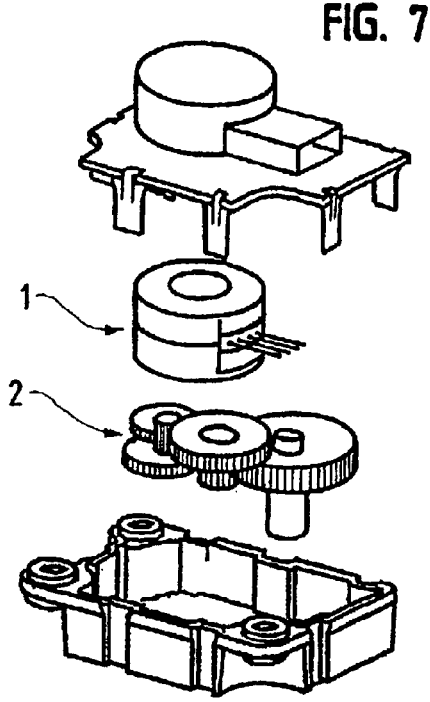
FIG. 7
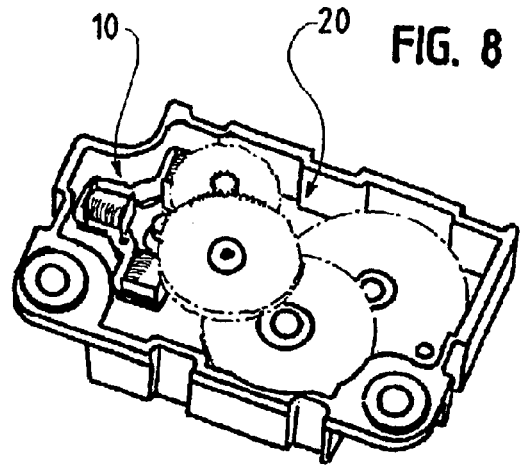
FIG. 8
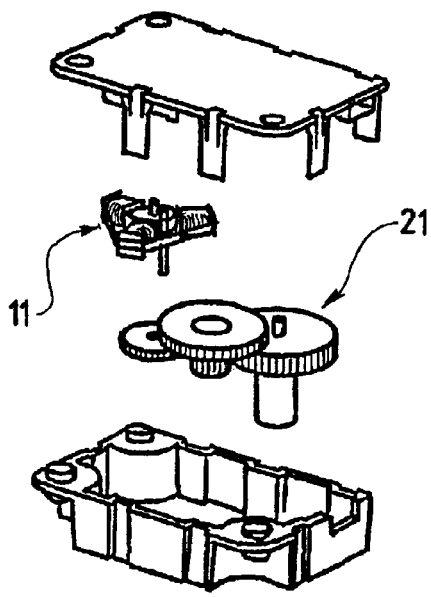
FIG. 9
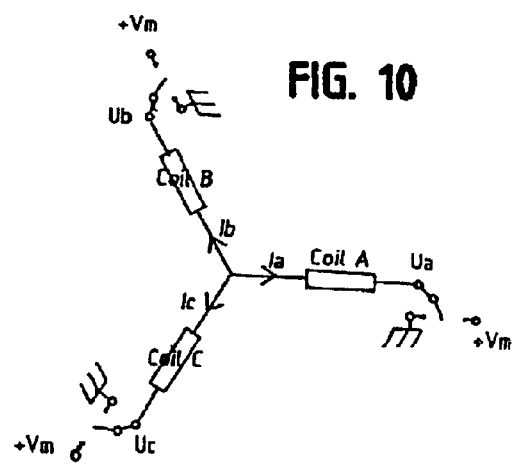
FIG. 10
FIG. 11

AIR CONDITIONING VALVE ACTUATOR FOR A MOTOR VEHICLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to an air conditioning valve actuator for a motor vehicle.

BACKGROUND OF THE INVENTION

Generally, an air-conditioning installation for a motor vehicle comprises valves including shutters, the opening and closing of which are motor-controlled by means of electric motors, such as stepper motors with permanent magnets, each associated with a reduction unit.

These air-conditioning installations for motor vehicles, which can be of the type as disclosed in DE 4343385 and FR 2731852, have many drawbacks. Besides the problems of manufacturing costs related to the power used and the size of the motors used, the movements of the shutters, when opening and closing, as well as the motors themselves generate sound problems that can difficultly be coped with through sound-insulating means, since the sound waves are conveyed through the ventilation conduits.

The noise generated by the shutters and the motors is mainly due to the characteristics of said motors, which will be set forth hereinafter by means of the description of a configuration of an air-conditioning valve-actuator for a motor vehicle, this configuration being the most often used one.

For reasons of simplicity and manufacturing costs for the control electronics, the control of this air conditioning valve actuator occurs at a fixed frequency of about 200 Hz The stepper motor includes a rotor with 6 pairs of poles, which can thus adopt 24 different positions, or steps, per revolution. Now, in a stepper motor, to each current-supply impulse corresponds a constant elementary rotation by one step, so that a determined number of impulses results into a corresponding number of steps and, hence, into a known rotation of the rotor. Therefore, the angular distance covered by the rotor between 2 steps is 15°, so that a control at a fixed frequency of 200 Hz results into a rotor speed of 3000°/second.

In order for this speed to be usable, the motor is associated with a reduction unit the gear train of which allows increasing the outlet torque and reducing the amplitude of the angular pitch. By using a reduction unit with a ratio of about 300, the fixed speed of rotation of the air-conditioning shutter is about 10°/second.

This being said, the need for an operation according to a so called "start-stop" mode, i.e. for instantaneously switching over, between two successive steps of the motor, in its starting phase, from 0 to 200 Hz, requires dimensioning the motor so that it be capable of accelerating the shutter inertia of said air-conditioning shutter and the rotor's own inertia within a time period close to 5 milliseconds, which corresponds to the duration of one step.

Now, in a "start-stop" operating mode, the torque of the motor is clearly lower than that of the same motor operating in the dynamic mode, since in the latter there is no need for an instantaneous acceleration of the inertia of the rotor and that of the air-conditioning shutter.

Therefore, in order to reach, at the outlet of the reduction unit, the torque required for moving an air-conditioning shutter in a "start-stop"-type operation, it is necessary to oversize the motor.

Furthermore, with a coil resistance maintained constant, the available mechanical power, the torque and the electric-power consumption extremely quickly increase with the power-supply voltage. Now, the air-conditioning valve has been designed so as to carry out its mission also at a degraded 8-Volt battery voltage, i.e. the torque required for moving the air conditioning shutter should also be reached at an 8-Volt voltage. The voltage of a non-controlled battery however varies between 8 and 14 Volt, so that the motor mostly operates at a voltage higher than 8 Volt, which, because of the increase in available mechanical power, torque and electric-power consumption, besides the increased noise, is also prejudicial to the valve's lifetime, since this causes, on the one hand, at the level of the reduction unit, an excessive blocking torque likely to damage the toothing of the latter and, on the other hand, an overheating of the winding of the motor.

Furthermore, in the field of the air-conditioning valve-actuators, the use of stepper motors requires, at each start, a re-initialization achieved by bringing the shutter of the valve into abutment. In the "start-stop" operating mode at 200 Hz, the valves generate a characteristic noise when the valve arrives in abutment, since the stepper motor is still at its synchronism speed and the rotor starts vibrating at about the stop position. Since the reduction unit is slightly elastic, the motor even accumulates energy while setting this type of spring formed by the gears and, in some applications, one can even see that the motor turns back by some tens of steps, under the action of this elasticity, when the current supply has been interrupted in the windings.

BRIEF SUMMARY OF THE INVENTION

The present invention is aimed at coping with the various above-mentioned drawbacks by providing an air-conditioning valve-actuator for a motor vehicle that, compared to the existing actuators, while meeting the minimal requirements of the application, generates less noise when in operation, has a higher efficiency and has a smaller size and weight, which represents a non-negligible cost saving.

The air-conditioning valve-actuator for a motor vehicle implements an electric motor such as a stepper motor with permanent magnet capable of delivering mechanical power at least equal to 50 mW, as well as a reduction unit allowing reducing the amplitude of the angular pitch and increasing the outlet torque, and it is mainly characterized in that said motor is defined by following relationship: $10^6$–$6<\gamma^2/R_0<50^6$, where $\gamma$ is the torque constant, expressed in Nm/At, proportional to the magnet volume and, $R_0$ is the characteristic coefficient of the volume of copper and the length of the average turn of the coils, expressed in Ohm/tr$^2$, $R_0 = \rho \cdot Lsp/(Scu \cdot \sigma)$, $\rho$ being the resistivity of copper, Lsp being the length of the average turn of a coil, Scu being the copper section of a coil and $\sigma$ the filling coefficient of a coil;

and in that it comprises means for controlling the power-supply to said motor allowing to gradually accelerate the frequency of power-supply to the windings to reach a working frequency of said motor higher than the "start-stop" starting frequency.

It is known that the motors of the air-conditioning valve actuators for motor vehicles have a dynamic torque given by following formula:

$$T_{th} = k \frac{\gamma \cdot ni_0}{\sqrt{1 + (\tau_e \omega_e)^2}} - \frac{\alpha \gamma^2}{R_0[1 + (\tau_e \omega_e)^2]}$$

where $T_{th}$ is the torque at a given speed, expressed in Nm
$\pi_e$ is the electric time constant, expressed in m.s
$\omega_e$ is the electric pulse, expressed in rad/s
$\alpha$ is the mechanical speed, expressed in rd/s
$ni_0$ is the number of Ampere-turns per coil at zero speed
K is a coefficient the value of which depends on the current supply mode and the type of motor, two-phase or three-phase.

This formula can also be written as follows:

$$T_{th} = k \frac{\gamma \sqrt{\frac{p_c}{R_0}}}{\sqrt{1 + (\tau_e \omega_e)^2}} - \frac{\alpha \gamma^2}{R_0[1 + (\tau_e \omega_e)^2]}$$

where Pe represents the electric-power dissipation in a phase of the motor.

It should be noted that each of both terms of this expression is proportional to the $\gamma^2/R_0$ factor, which can be used to define the motors with permanent magnet, since the torque constant $\gamma$ is proportional to the magnet volume, whereas coefficient $R_0$ is inversely proportional to the copper volume.

One should note that the motors presently used in the air-conditioning applications and the current-supply frequency of which is 200 Hz have a $\gamma^2/R_0$ factor the value of which is close to $100^{6-6}$.

Therefore, for a valve actuator according to the invention, the $\gamma^2/R_0$ factor of which is between $10^6-6$ and $<50^6-6$, a mechanical power at least equal to 50 mW can be achieved only at a high current-supply frequency, about twice that of the motors presently used.

Of course, the reduction ratio should be changed proportionally.

Since the torque constant $\gamma$ is proportional to the magnet volume and the $R_0$ coefficient is inversely proportional to the copper volume, the reduction of the $\gamma^2/R_0$ factor results, for identical performances in terms of mechanical power, into a considerable reduction of the magnet and copper volume, which has, in addition, an incidence on the manufacturing costs, into a reduction in weight and into a reduction of the vibrations and the noise, because of the reduction of the motor inertia.

On the other hand, due to the characteristics of the motor, the high current-supply frequency does not allow a classical "start-stop" operation; it is therefore absolutely necessary to proceed, through a controller, to a gradual increase of the current-supply frequency, starting from a sufficiently low frequency for allowing separating the shutter.

According to an additional feature of the actuator according to the invention, it includes a controller for controlling the power of the current supply to the motor.

Such controller allows allow, for example, maintaining the average voltage as seen by the motor at a constant value, which is preferably 8 Volt.

According to a preferred embodiment of the actuator according to the invention, the motor is a three-phase motor with star or delta connection, driven by six transistors.

According to the invention, the rotor speed of the motor is at least 5400 degrees per second, while the reduction ratio is higher than 540.

Further advantages and features of the actuator according to the invention will clearly appear from the following description, with reference to the attached drawing that show several non-restrictive embodiments of it.

BRIEF DESCRIPTION OF THE SEVERAL VIEWS OF THE DRAWINGS

FIG. 7 is a perspective and exploded view of a first embodiment of the motor of the actuator according to the invention.

FIG. 8 is a perspective view of a second embodiment of the motor of the same actuator.

FIG. 9 is a perspective and exploded view of a third embodiment of the motor of the same actuator.

FIG. 10 shows a diagrammatic illustration of the control mode for the motor described in FIG. 9.

FIG. 11 is a table showing the various power-supply sequences for the same motor.

DETAILED DESCRIPTION OF THE INVENTION

Figure 1:
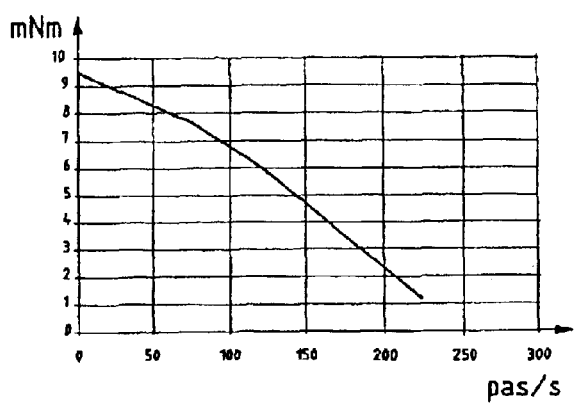
FIG. 1 is a graph showing the available torque of the motor of an air-conditioning valve actuator presently used, when operating in "start-stop" mode.

When referring to FIG. 1, one can see the evolution of the available torque when instantaneously switching over from 0 Hz to any value of speed, i.e. in the "start-stop" operating mode, for a stepper motor with permanent magnet the air-conditioning valve actuators for a motor vehicle are provided with, which is standard for it and the characteristics of which are: 24 steps/revolution, 200 Hz current-supply frequency, 8-Volt voltage and 100-Ohm coil resistance.

Figure 2:
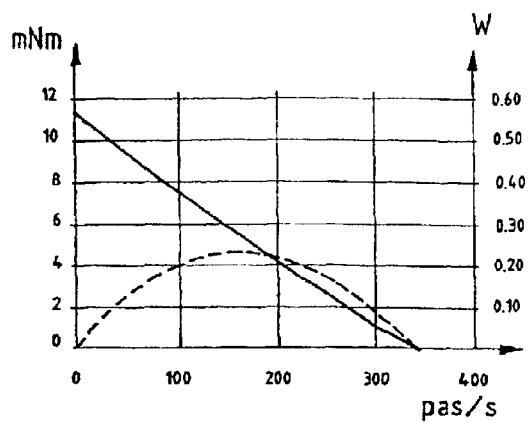
FIG. 2 is a graph showing the dynamic torque and the mechanical power of the same motor when operating in dynamic mode.

When referring to FIG. 2, one can see, for the same motor, the evolution of the available torque for any set speed, i.e. in the dynamic operating mode.

When comparing these two graphs, one notices of course that at 200 Hz the dynamic torque is clearly higher than the "start-stop" torque, since they are about 2 and 4 mNm.

A 2 mNm "start-stop" torque provides, at the outlet of a ⅟300 reduction unit with a 70% efficiency, a 420 mNm useful torque at a voltage of 8 volts, which corresponds to the torque required for an air-conditioning valve at that current-supply voltage.

Thus, one sees that this stepper motor is oversized to be capable of operating in the "start-stop" mode at 200 Hz. The mechanical power required for the air-conditioning application is indeed of 420 mNm×10°/second, i.e. 50 mW and is also shown in FIG. 2, by an interrupted line, whereby the mechanical power, expressed in Watt, can be delivered by the motor at a fixed 200 Hz speed, always at an 8 Volt current-supply voltage. One can see that at 200 Hz, the power is 220 mW, i.e. about twice the power required for the application, when taking into consideration a 70% efficiency of the reduction unit.

Figure 3:
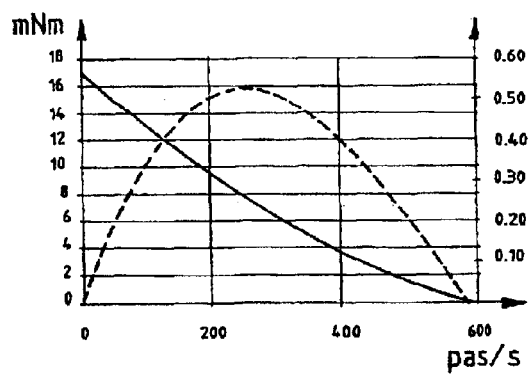
FIG. 3 is a graph showing the dynamic torque and the mechanical power when operating in dynamic mode for a similar motor at a higher power-supply voltage.

When referring now to FIG. 3, one can see a graph similar to that of FIG. 2, for an identical motor, except that its current-supply voltage is 14 Volt.

When comparing these two graphs, one can see that, with a coil resistance maintained constant, the available mechanical power, the torque and the electric-power consumption quickly increase as the current-supply voltage increases.

As has been set forth above, the motor is designed to operate with a degraded 8-Volt battery, which however permanently supplies a much higher current-supply voltage, so that the excess performances of the motor, when the voltage is higher than 8 Volt, are not used and are therefore not necessary and, in addition, they are prejudicial to the valve's lifetime and are a source for additional noise problems.

Figure 4:
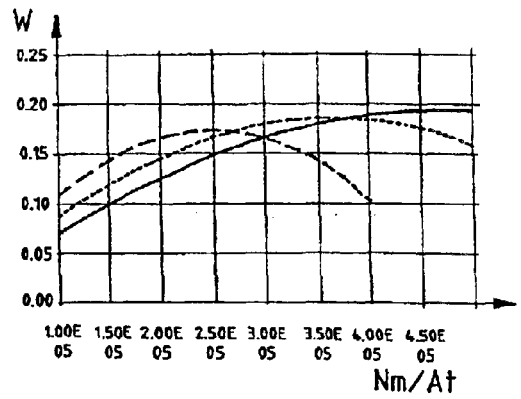
FIG. 4 is a graph showing the mechanical power as a function of the torque constant of a similar motor at various speeds of rotation of the rotor.

When referring now to FIG. 4, one can see a graph that shows, for an 8-Volt two-phase motor, the mechanical power as a function of γ, the motor's torque constant, at several speeds, hence at several current-supply frequencies, curves A, B and C showing speeds of 600, 400 and 200 steps/second, respectively. It clearly appears from this graph that the higher the torque constant γ, the lower the speed of rotation at which the maximum power is achieved.

It can also be observed that it is possible to achieve mechanical powers at the outlet of the motors very close to each other with very different torque constants, at different speeds of rotation.

Therefore, assuming that the mechanical power necessary for the application is close to 50 mW, that the efficiency of the reduction unit is close to 0.5 and that iron losses should be taken into consideration, the mechanical power required at the level of the motor is close to 0.15 Watt, irrespective of the current-supply voltage. It can be seen that this mechanical power at the level of the motor can be achieved by a motor with a torque constant of $2{,}5^6$–5 Nm/At rotating at 600 steps/second as well as by a motor with a torque constant of $4^6$–5 Nm/At rotating at 200 steps/second, which corresponds to the motors presently used.

The air-conditioning valve actuator for a motor vehicle according to the invention includes a motor the rotor speed of which is higher than 5400 degrees per second, as well as a reduction unit the reduction ratio of which is therefore, and preferably, higher than 540.

In addition, from the relationship:

$$T_{th} = k \frac{\gamma \sqrt{\frac{p_c}{R_0}}}{\sqrt{1+(\tau_e \omega_e)^2}} - \frac{\alpha \gamma^2}{R_0[1+(\tau_e \omega_e)^2]}$$

it is known that the torque of a motor at a given speed is proportional to the $\gamma^2/R_0$ factor, therefore, the air-conditioning valve actuator according to the invention is defined by a $\gamma^2/R_0$ factor between: $10^6$–6 and $50^6$–6.

Since the acceleration torque necessary to accelerate the inertia of the rotor and the inertia of the shutter, at high current-supply frequency, is higher than the torque available on a motor of such a size, in the "start-stop" operating mode, it is necessary to define another operating mode.

Figure 5:
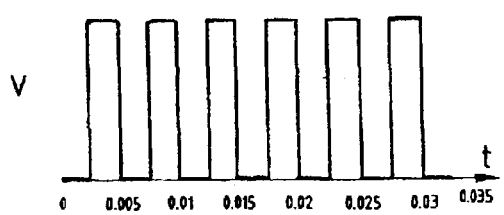
FIG. 5 is a graph showing the power-supply frequency in the "start-stop" operating mode.
Figure 6:
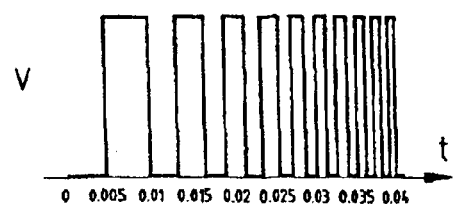
FIG. 6 is a graph showing the power-supply frequency for the motor of an air conditioning valve actuator for a motor vehicle according to the invention.

In FIG. 5 has been shown the current-supply frequency in the "start-stop" operating mode, which has to be compared with that of the chosen operating mode shown in FIG. 6.

This operation mode, called "ramping mode", allows implementing a gradual acceleration of the frequency, until reaching the required frequency, while starting from a frequency that allows the motor to deliver the necessary accelerating torque for accelerating the inertia of the rotor and the inertia of the shutter, that means that before the acceleration the operating mode is similar to a "start-stop" mode.

This operating mode has another advantage, at the level of the re-initialization. With a motor of a valve actuator according to the invention operating above the "start-stop" speed, when the shutter strikes against the stop, the motor indeed automatically loses its synchronous speed. When synchronism is lost at high speed against the stop, the setting and kick back phenomenon noticed with the existing actuators is strongly attenuated, because the rotor cannot restart in a synchronous way, since the energizing frequency is higher than the "startstop" speed and the dynamic torque present at the moment of the shock is smaller.

Because of the small size of the motor used in the actuator according to the invention, the electric power supplied to the inlet of the motor has to be controlled, in order not to let the current-supply voltage vary between 8 and 14 Volt, and to limit the Joule power dissipation in the windings of the motor.

The actuator according to the invention allows detecting the value of the current-supply voltage and controlling, by means of a chopping technique, the percentage of this voltage applied to the windings of the motor. By way of an example, the ratio will be 100% for an 8 Volt current-supply voltage and 57% for a 14 Volt current-supply voltage.

This chopping technique furthermore allows reducing the current when at stop; when no shutter-movement function is required, a limited-operation factor, for example 10%, can indeed be applied, in order to maintain the valve in its position.

Moreover, this technique also allows, during the acceleration and deceleration phases, which are very limited in time, about 50 ms, to apply a 100%-operation factor and to switch over again to a normal-operation factor during the movements at constant speed.

The stepper motor with permanent magnet of an air-conditioning valve-actuator for a motor vehicle according to the invention can be of various types, some of which are shown in FIGS. 7, 8 and 9.

In FIG. 7 is shown a two-phase motor 1 with a deep-drawn plate with a 20 mm outer diameter, 24 steps/revolution, operating at 400 Hz and coupled to a reduction unit 2 the reduction ratio of which is close to 600. By way of comparison, for the same function, a motor of the same type operating at 200 Hz, but with a 35 mm diameter, is presently used.

When referring now to FIG. 9, one can see the preferred embodiment of the gear motor of an actuator according to the invention. It includes a three-phase motor 11 with permanent magnet, 30 steps/revolution, having 5 pairs of poles at the rotor, operating at 450 Hz and coupled to a reduction unit 21 the reduction ratio of which is close to 540.

The three-phase motor allows, for the same digital phase-switching mode, two fed phases, a higher resolution than the motors shown in FIGS. 7 and 8 that allow resolution modes of 20 and 24 steps per revolution, respectively, whereas the motor shown in FIG. 9 has a resolution of 30 full steps per revolution. The noise and vibrations of the motor during operation will thus be reduced.

On the other hand, the digital phase-switching mode of the three-phase motor can be carried out by means of only six transistors, whereas eight transistors are necessary for the bipolar two-phase motors (current flowing in the coil of one phase in both directions).

Where referring now to FIG. 10, one can see that the preferred control mode for example consists in connecting the three-phase motor according to the "star" connection, by successively feeding two by two the phases A, B, C according to a sequence described in FIG. 11. A "2 phases ON" current supply used on a three-phase motor allows a 20% torque gain, compared to the same control mode used on a two-phase motor, 1.414 times the 1-phase-ON torque. In addition, the change in the torque between 2 phase switchings is smaller in a three-phase motor than in a two-phase motor, which will cause a lesser change in rotor speed during operation.

The control of an air-conditioning valve actuator for a motor vehicle by means of a three-phase motor thus provides, compared to a two-phase motor:

less noise and vibrations, thanks to the reduction of the torque undulation and to the increase of the resolution, a cheaper electronic control, and a better efficiency, because of the increased available toque for the same electric power at the inlet.

On the other hand, such a three-phase motor requires only three current-supply threads, whereas a two-phase motor requires four of them.

We claim:

1. An air conditioning valve actuator for a motor vehicle comprising:

a stepper motor means having a permanent magnet with a mechanical power output of at least 50 mW, said stepper motor means for producing an angular pitch and an outlet torque, said stepper motor means having a volume of copper therein and a length of the copper in coils, said stepper motor means having a working frequency and a starting frequency;

a reducing means cooperative with said stepper motor means for reducing an amplitude of the angular pitch and for increasing the outlet torque, said stepper motor means defined by relationship of $10^{-6} < \gamma^2/R_0 < 50^{-6}$ where $\gamma$ is the torque constant proportional to a volume of said permanent magnet, $R_0$ is a characteristic coefficient of the volume of copper and the length of the average turn of the coils, $R_0 = \rho Lsp/(Scu.\sigma)$ in which $\rho$ is a resistivity of copper and in which Lsp is a length of the average turn of a coil and in which Scu is a copper section of the coil and in which $\sigma$ is a filling coefficient of the coil;

a power supply connected to said stepper motor means, said power supply having a frequency and a current supply; and controlling means interactive with said power supply and said stepper motor means, said controlling means for gradually accelerating the frequency of said power supply to the coils of said stepper motor means to reach the working frequency of said stepper motor means, said working frequency being higher than said starting frequency.

2. The structure of claim 1, said power supply having meas for controlling a power of the current supply to said stepper motor means.

3. The structure of claim 1, said stepper motor means being a star-connected three-phase motor driven by six transistors.

4. The structure of claim 1, said stepper motor means being a delta-connected three-phase motor driven by six transistors.

5. The structure of claim 1, said stepper motor means having a rotor speed of at least 5400 degrees per second, said reducing means having a reduction ratio of greater than 540.

* * * * *